United States Patent
Park et al.

(10) Patent No.: US 11,095,531 B2
(45) Date of Patent: Aug. 17, 2021

(54) SERVICE-AWARE SERVERLESS CLOUD COMPUTING SYSTEM

(71) Applicant: Samsung Electronics Co., Ltd., Suwon-si (KR)

(72) Inventors: Eunsoo Park, Suwon-si (KR); Jaeman Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/670,495

(22) Filed: Oct. 31, 2019

(65) Prior Publication Data

US 2020/0145300 A1 May 7, 2020

(30) Foreign Application Priority Data

Nov. 5, 2018 (KR) .......................... 10-2018-0134699

(51) Int. Cl.
*G06F 13/00* (2006.01)
*H04L 12/24* (2006.01)

(52) U.S. Cl.
CPC ...... *H04L 41/5025* (2013.01); *H04L 41/0853* (2013.01); *H04L 41/0866* (2013.01); *H04L 41/12* (2013.01)

(58) Field of Classification Search
CPC . H04L 41/5022; H04L 41/5025; H04L 41/12; H04L 41/0853; H04L 41/0866; H04L 43/0852; H04L 41/5019
USPC .... 718/103, 104, 102, 100, 1; 709/232, 235, 709/230, 240
See application file for complete search history.

(56) References Cited

U.S. PATENT DOCUMENTS

| | | | | |
|---|---|---|---|---|
| 6,073,175 A | * | 6/2000 | Tavs | H04L 29/06 709/226 |
| 7,720,990 B2 | * | 5/2010 | Shen | H04L 41/5003 709/235 |
| 8,776,076 B2 | * | 7/2014 | Chi | G06Q 30/0283 718/105 |
| 8,892,708 B2 | * | 11/2014 | Merrill | H04L 41/5041 709/223 |

(Continued)

FOREIGN PATENT DOCUMENTS

| KR | 10-2006-0114146 A | 11/2006 |
|---|---|---|
| KR | 10-2012-0082598 A | 7/2012 |

(Continued)

OTHER PUBLICATIONS

International Search Report and Written Opinion dated Feb. 19, 2020, issued in International Application No. PCT/KR2019/014684.

(Continued)

*Primary Examiner* — Kenneth R Coulter
(74) *Attorney, Agent, or Firm* — Jefferson IP Law, LLP

(57) ABSTRACT

An electronic apparatus is provided. The electronic apparatus includes a communicator, a memory configured to store at least one instruction, and at least one processor configured to execute the at least one instruction. The at least one processor is configured to receive a plurality of requests to execute functions through the communicator, identify a service-level agreement (SLA) for each of a plurality of functions corresponding to the plurality of requests, determine priorities of the plurality of functions based on the identified SLAs, and execute the plurality of functions according to the determined priorities.

16 Claims, 11 Drawing Sheets

(56) References Cited

U.S. PATENT DOCUMENTS

| | | | |
|---|---|---|---|
| 9,219,657 B2* | 12/2015 | Dawson | G06F 9/5088 |
| 9,363,312 B2* | 6/2016 | Jensen | H04L 69/22 |
| 10,210,468 B2* | 2/2019 | Gujar | G06Q 30/0631 |
| 10,747,521 B2* | 8/2020 | Karagiannis | G06F 8/60 |
| 2008/0168446 A1* | 7/2008 | Shen | H04L 67/322 |
| | | | 718/101 |
| 2012/0030341 A1* | 2/2012 | Jensen | H04L 67/2804 |
| | | | 709/224 |
| 2012/0096470 A1 | 4/2012 | Bartfai-Walcott et al. | |
| 2013/0018999 A1* | 1/2013 | Merrill | H04L 41/5041 |
| | | | 709/223 |
| 2013/0191843 A1 | 7/2013 | Sarkar et al. | |
| 2014/0200947 A1* | 7/2014 | Gujar | H04L 67/02 |
| | | | 705/7.26 |
| 2014/0237108 A1 | 8/2014 | Kurabayashi | |
| 2014/0297848 A1 | 10/2014 | Sanamrad | |
| 2015/0026695 A1* | 1/2015 | Dawson | G06F 9/4893 |
| | | | 718/103 |
| 2016/0134490 A1 | 5/2016 | Balasubramanyan et al. | |
| 2016/0162823 A1* | 6/2016 | Gujar | G06Q 10/06315 |
| | | | 705/7.25 |
| 2018/0101403 A1 | 4/2018 | Baldini Soares et al. | |
| 2018/0176070 A1 | 6/2018 | Shafiee et al. | |
| 2019/0012157 A1* | 1/2019 | Karagiannis | H04L 41/5096 |
| 2019/0036835 A1* | 1/2019 | Chakra | H04L 41/0806 |

FOREIGN PATENT DOCUMENTS

| | | |
|---|---|---|
| KR | 10-1630125 B1 | 6/2016 |
| WO | 2018/108001 A1 | 6/2018 |

OTHER PUBLICATIONS

Microsoft, SLA for Azure Functions, Nov. 2016, (https://azure.Microsoft.com/en-us/support/legal/sla/functions/v1_0/).

Amazon, AWS Service-Level-Agreements, Aug. 27, 2018, (https://aws.amazon.com/de/legal/service-level-agreements/).

* cited by examiner

FLA: 66.67%
SLA: 0%

FLA: 66.67%
SLA: 50%

```
ADVANCED SETTING
    ⊙ FUNCTION GRADE  – Trial (5 days left)
```

FIG. 10

ADVANCED SETTING
    ○ FUNCTION LEVEL – Trial (1 days left)
        ○ Premium 3s
        ◉ High 6s
        ○ Default 10s
        ○ Economy 20s
                                                               [CHECK]

SERVICE-AWARE SERVERLESS CLOUD COMPUTING SYSTEM

CROSS-REFERENCE TO RELATED APPLICATION(S)

This application is based on and claims priority under 35 U.S.C. § 119(a) of a Korean patent application number 10-2018-0134699, filed on Nov. 5, 2018, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus which adjusts an order of processing requests for functions to ensure a service level agreement in a serverless computing system environment, and a control method thereof.

2. Description of Related Art

Recently, there is an increasing interest in serverless computing technologies. Serverless computing is one of cloud computing execution models, and refers to a system wherein a developer prepares a source code (or a function) of an application and registers the code without having to care about provisioning or operation of a server, and then a platform executes the code on its own and returns the execution result to the developer.

The word 'serverless computing' itself could be interpreted to mean that there is no server, but the term does not mean that there is no server in a physical sense. Rather, serverless computing provides a manner of using resources only when they are necessary based on an event, and the word 'serverless' is used to mean that there is no dedicated server which has been particularly allocated to the event.

Serverless computing dynamically manages allocation of machine recourses. Prices are set based on the actual amount of resources consumed by an application, but not the unit of amount of computing resources that were purchased in advance.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus adjusting an order of processing requests for functions to ensure a service level agreement in a serverless computing system environment, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a communicator, a memory configured to store at least one instruction and at least one processor configured to execute the at least one instruction. The processor is configured to receive a plurality of requests to execute functions through the communicator, identify a service-level agreement (SLA) for each of a plurality of functions corresponding to the plurality of requests, determine priorities of the plurality of functions based on the identified SLAs, and execute the plurality of functions according to the determined priorities.

Here, the at least one processor may determine priorities of the plurality of functions based on the SLA for each of the plurality of functions and function topology information.

In addition, the at least one processor may obtain information on consecutive execution of functions based on a specific function internally calling another function, and generate the function topology information based on the obtained information on consecutive execution of functions.

Meanwhile, the at least one processor may change the function topology information according to registration of a new function and correction of a pre-registered function.

Also, the at least one processor may calculate, with respect to each of the plurality of functions, a remaining time which is a result of subtracting from an allowed latency defined by the SLA a predicted execution time calculated based on the function topology information, and determine priorities of the plurality of functions in the order of having a less remaining time calculated with respect to each of the plurality of functions.

Further, the at least one processor may check information on the SLAs included in the hypertext transfer protocol (HTTP) headers of the plurality of requests and identify the SLA for each of the plurality of functions.

Meanwhile, the at least one processor may convert the plurality of requests into message formats, and insert each of the plurality of messages generated by the conversion into a first message queue or a second message queue according to the priorities determined for each of the plurality of functions, dequeue the message inserted into the first message queue prior to the message inserted into the second message queue, and execute a function corresponding to the dequeued message.

Also, the at least one processor may store a plurality of versions for the pre-registered function according to correction of the pre-registered function, and if correction that cannot comply with the SLA occurs with respect to the pre-registered function and a request to execute the pre-registered function is received, the at least one processor may execute the pre-registered function in a version of the time before the correction that cannot comply with the SLA occurred.

Further, when a new function is registered, the at least one processor may obtain information on the execution time of the new function for a preset time, determine a plurality of SLAs in different grades for the new function based on the obtained information on the execution time, and provide a user interface (UI) for selection of any one of the plurality of determined SLAs.

Here, when an SLA for the new function is set through the provided UI, the at least one processor may associate information on the set SLA with the new function, and store the information in the memory.

In accordance with another aspect of the disclosure, a method for controlling an electronic apparatus is provided. The method includes receiving a plurality of requests to execute functions, identifying an SLA for each of a plurality of functions corresponding to the plurality of requests, determining priorities of the plurality of functions based on the identified SLAs, and executing the plurality of functions according to the determined priorities.

Here, in the determining of the priorities, priorities of the plurality of functions may be determined based on the SLA for each of the plurality of functions and function topology information.

Also, the method according to another embodiment of the disclosure may further include obtaining information on consecutive execution of functions based on a specific function internally calling another function, and generating the function topology information based on the obtained information on consecutive execution of functions.

Further, the method according to another embodiment of the disclosure may further include changing the function topology information according to registration of a new function and correction of a pre-registered function.

Meanwhile, in the determining of the priorities, a remaining time may be calculated with respect to each of the plurality of functions, which is a result of subtracting from an allowed latency defined by the SLA a predicted execution time calculated based on the function topology information, and priorities of the plurality of functions may be determined in the order of having a less remaining time calculated with respect to each of the plurality of functions.

Also, in the identifying, information on the SLAs included in the HTTP headers of the plurality of requests may be checked and the SLA for each of the plurality of functions may thereby be identified.

Meanwhile, the method according to another embodiment of the disclosure may further include converting the plurality of requests into message formats. Also, in the executing of the plurality of functions, each of the plurality of messages generated by the conversion may be inserted into a first message queue or a second message queue according to the priorities determined for each of the plurality of functions, the message inserted into the first message queue may be dequeued prior to the message inserted into the second message queue, and a function corresponding to the dequeued message may be executed.

Further, the method according to another embodiment of the disclosure may further include storing a plurality of versions for the pre-registered function according to correction of the pre-registered function, and if correction that cannot comply with the SLA occurs with respect to the pre-registered function and a request to execute the pre-registered function is received, executing the pre-registered function in a version of the time before the correction that cannot comply with the SLA occurred.

In addition, the method according to another embodiment of the disclosure may further include, when a new function is registered, obtaining information on the execution time of the new function for a preset time, determining a plurality of SLAs in different grades for the new function based on the obtained information on the execution time, and providing a UI for selection of any one of the plurality of determined SLAs.

Here, the method according to another embodiment of the disclosure may further include, when an SLA for the new function is set through the provided UI, associating information on the set SLA with the new function, and storing the information in the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a diagram for illustrating a user interface (UI) for selection of the grade of an SLA by a user according to an embodiment of the disclosure;

FIG. 10 is a diagram for illustrating a UI for selection of the grade of an SLA by a user according to an embodiment of the disclosure.

Throughout the drawings, it should be noted that like reference numbers are used to depict the same or similar elements, features, and structures.

DETAILED DESCRIPTION

Figure 1:
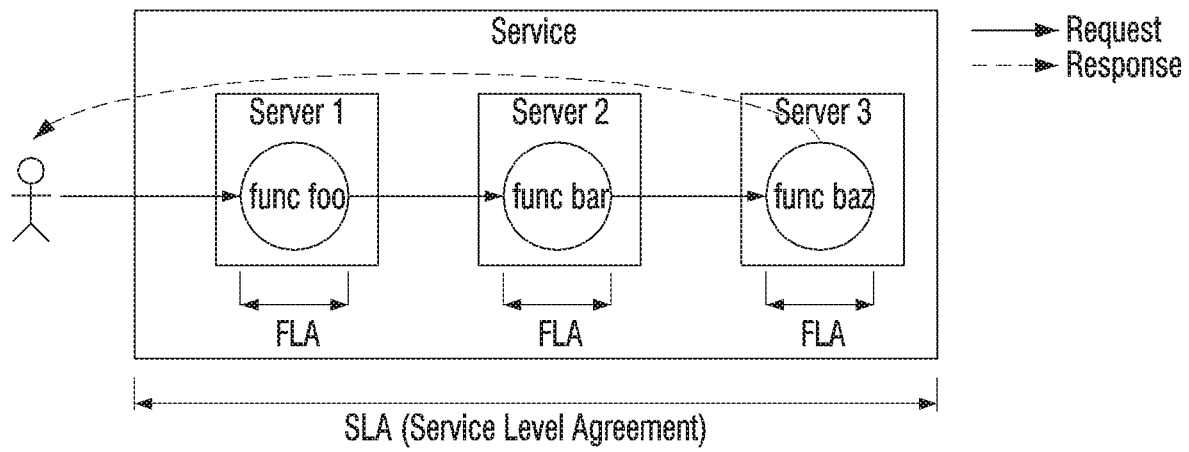
FIG. 1 is a diagram for illustrating the concepts of a function-level agreement (FLA) and a service-level agreement (SLA) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiment, described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, terms such as "have," "may have," "include" and "may include" should be construed as denoting that there are such characteristics (e.g., elements such as numerical values, functions, operations and components), and the terms are not intended to exclude the existence of additional characteristics.

Also, in the disclosure, the expressions "A and/or B," "at least one of A and/or B," or "one or more of A and/or B" and the like may include all possible combinations of the listed items. For example, "A or B," "at least one of A and B" or "at least one of A or B" refer to all of the following cases: (1) including at least one A, (2) including at least one B or (3) including at least one A and at least one B.

Further, the expressions "first," "second" and the like used in the disclosure may be used to describe various elements regardless of any order and/or degree of importance. Also, such expressions are used only to distinguish one element from another element, and are not intended to limit the elements. For example, a first user device and a second user device may refer to user devices that are different from each other, regardless of any order or degree of importance. Accordingly, a first element may be called a second element, and a second element may be called a first element in a similar manner, without departing from the scope of the disclosure.

Meanwhile, the terms "a module," "a unit," "a part" and the like used in the disclosure are for referring to elements performing at least one function or operation, and these elements may be implemented as hardware or software, or as a combination of hardware and software. Further, a plurality of "modules," "units," "parts" and the like may be integrated into at least one module or chip and implemented as at least one processor, except when each of them has to be implemented as individual, specific hardware.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element). In contrast, the description that one element (e.g., a first element) is "directly coupled" or "directly connected" to another element (e.g., a second element) can be interpreted to mean that still another element (e.g., a third element) does not exist between the one element and the other element.

Further, the expression "configured to" used in the disclosure may be interchangeably used with other expressions such as "suitable for," "having the capacity to," "designed to," "adapted to," "made to" and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Meanwhile, the terms used in the disclosure are used to explain certain embodiments of the disclosure, and are not intended to limit the scope of the other embodiments. The terms used in the disclosure, including technical or scientific terms, may have meanings identical to those generally known to those of ordinary skill in the art described in the disclosure. Terms defined in general dictionaries among the terms used herein may be interpreted to have the same meaning as or a similar meaning to the contextual meaning in the related art. Unless otherwise defined, the terms used herein may not be interpreted to have an ideal or overly formal meaning. In some cases, even terms defined herein may not be interpreted to exclude the embodiments herein.

Hereinafter, the disclosure will be described in more detail with reference to the accompanying drawings. In explaining the disclosure, in case it is determined that detailed explanation of related known functions or features may unnecessarily confuse the gist of the disclosure, the detailed explanation will be omitted. Also, with respect to the detailed description of the drawings, similar components may be designated by similar reference numerals.

The embodiments described in the disclosure relate to a serverless computing system. A serverless computing system may provide a cloud computing method wherein a response is provided by executing a code for an event. Here, the expression "serverless," i.e., the expression that there is no server, may denote that there is no server separately allocated to the event, and therefore, a developer does not need to perform infra and platform management. In a serverless computing system, a response can be provided by executing a function which is a processing unit of serverless computing. Here, a function may refer to a group of codes performing specific operations.

A provider of a serverless computing system may charge a developer (a user) according to an agreement which is an agreement on a measurement index and a purpose of a service provided by the provider. Here, an agreement may correspond to a promise that the provider will give a refund if the target numerical value (in general, time that takes from receiving a request to execute a function to providing a response (e.g., round trip time)) is not reached. An agreement may exist for a function, or for the entire service. An agreement for a function is called a function-level agreement (FLA), and an agreement for the entire service is called a service-level agreement (SLA). An SLA may also be referred to as quality of service (QoS). Meanwhile, a function which is a computing unit in serverless computing does not always mean a service. A service can be completed after all of a series of functions are called.

FIG. 1 is a diagram for illustrating concepts of an FLA and an SLA according to an embodiment of the disclosure. For example, in an SLA, a promise can be made, which is that a function will be made to be executed within an allowed latency, and if the execution exceeds the allowed latency, a refund will be given.

In technologies of the related art, for example, in the serverless computing system named Azure® of Microsoft, only an FLA is specified. Meanwhile, in the serverless computing system named Lambda® of Amazon web services (AWS), neither an FLA nor an SLA is specified. The reason that an SLA is not specified may be that all functions in a serverless computing system can be independently developed and corrected. For example, an internal call function may be added in a function, and the content of the internal call function may also be changed. In other words, a latency between the time when a request to execute a function was made and the time when a response was made could change anytime according to dynamic correction of the function, and thus it was difficult to specify an SLA. Further, it was also difficult to specify an SLA due to the increase in the number of functions for performing a service and in relational complexity.

In order to address the disadvantage of serverless computing systems of the related art as above, a serverless computing system according to an embodiment of the disclosure is aimed at specifying an SLA, and guaranteeing the SLA with the best effort, even if the SLA cannot be satisfied perfectly.

Hereinafter, the method according to the disclosure will be explained by comparing it with a method of the related art, with reference to FIGS. 2A and 2B.

Figure 2A:
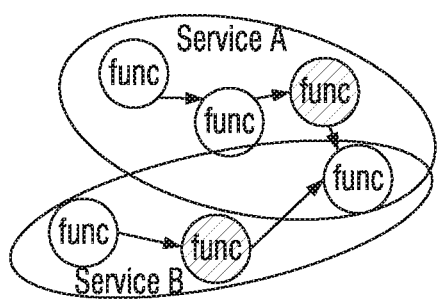
FIGS. 2A and 2B are diagrams for illustrating the method according to various embodiments of the disclosure by comparing the method according to the related art.
Figure 2B:
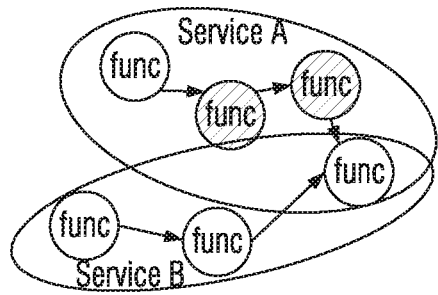

FIG. 2A illustrates a method according to the related art, and in the method of the related art, the SLA cannot be fulfilled for both service A and service B (failure to fulfill the agreement was expressed as "0%"), due to the functions that do not comply with the FLA (indicated by slanted lines). In contrast, FIG. 2B illustrates the method according to an embodiment of the disclosure, and in the part, the SLA cannot be fulfilled for service A due to the functions that do not comply with the FLA (indicated by slanted lines), but for service B, the SLA can be fulfilled. That is, even though the probability that the FLA cannot be fulfilled in the method according to the disclosure may be the same as in a method of the related art, the SLA can be fulfilled to some extent, depending on functions of which service are given priorities and executed.

Figure 3:
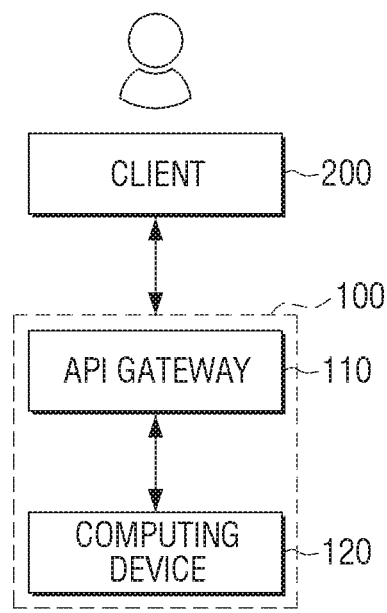
FIG. 3 is a diagram for illustrating a serverless computing system according to an embodiment of the disclosure.

FIG. 3 is a diagram for illustrating a serverless computing system according to an embodiment of the disclosure.

Referring to FIG 3, a system 100 includes an application programming interface (API) gateway 110 that receives requests to execute functions from a client 200 and a computing device 120 that provides a response by executing functions.

The API gateway 110 performs the role of a single entry point for several clients 200. The API gateway 110 may be implemented as a server that integrates end points for all requests from clients 200. The API gateway 110 may receive requests to execute functions from several clients 200, and transmit the requests to the computing device 120.

The client 200 may be a hardware client, a software client, an application and the like. According to an embodiment of the disclosure, the client 200 may be implemented as an electronic device such as a mobile phone, a tablet personal computer (PC), a desktop, a terminal for digital broadcasting, an IoT device, a wearable device, a consumer electronics (CE) device, and the like.

The client 200 may transmit a function call to the API gateway 110. According to an embodiment of the disclosure, a function call may be implemented by performing a RESTful API call for an end point associated with the API gateway 110. The RESTful API may specify a function identified by a uniform resource locator (URL) based on a hypertext transfer protocol (HTTP) and a URL.

The computing device 120 may execute functions based on a function call received from the API gateway 110.

The computing device 120 may be implemented as a server such as a cloud server and an artificial intelligence server. However, the disclosure is not limited thereto, and the computing device 120 may be implemented as any electronic device.

The computing device 120 may use a virtualization technology for using resources effectively. According to an embodiment of the disclosure, the computing device 120 may use a container technology. For example, there are technologies such as linux containers (LXC), a docker for a windows operating system, and a rocket which refers to a standard-based application program container technology. The computing device 120 may execute software on one or more containers.

The system 100 according to the embodiments of the disclosure may adjust the priorities of execution of functions based on SLAs, and make the SLAs guaranteed as much as possible by executing functions according to the priorities.

Priorities may be designated at the API gateway 110, or they may be designated at the computing device 120. The API gateway 110 may designate priorities according to the SLAs for functions which were requested to be executed, and the computing device 120 may designate priorities by considering function topology information as well as the SLAs. Hereinafter, with respect to designation of priorities, the API gateway 110 and the computing device 120 will be described in detail with reference to FIG. 4.

Figure 4:
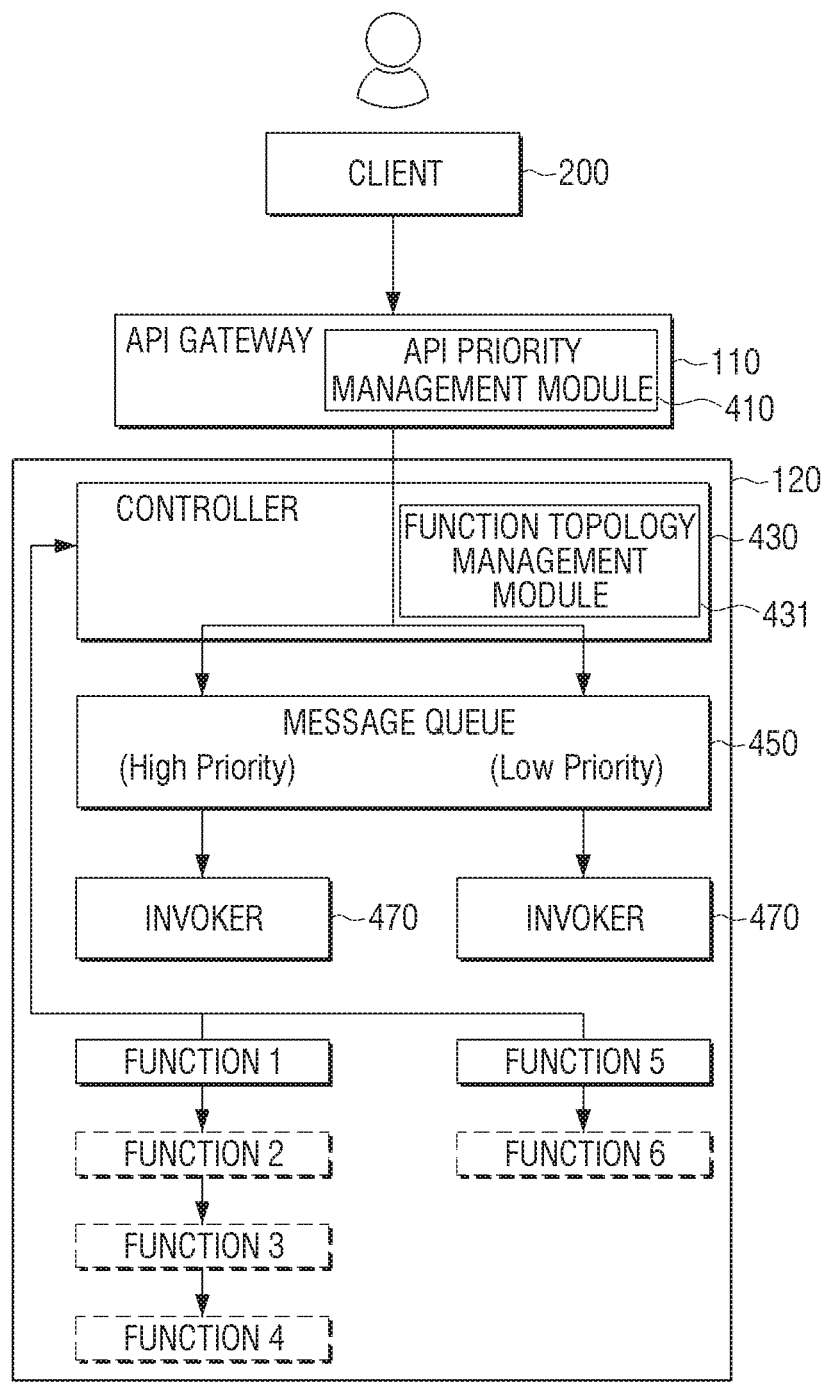
FIG. 4 is a diagram for illustrating a serverless computing system according to an embodiment of the disclosure.

FIG. 4 is a diagram for illustrating a serverless computing system according to an embodiment of the disclosure.

Referring to FIG. 4, the system 100 may include an API gateway 110 and a computing device 120.

The API gateway 110 may include an API priority management module 410 that designates grades of priorities for each of the received requests to execute functions.

The API priority management module 410 may include a database storing SLAs for the functions registered in the system 100. The API priority management module 410 may check the SLAs for functions corresponding to the received requests to execute functions by referring to the database, and designate grades of priorities for the requests based on the checked information on the SLAs. Requests of which grades of priorities have been designated may be transmitted to the computing device 120. The API priority management module 410 will be described in more detail later with reference to FIG. 5.

The computing device 120 may include a controller 430, a message queue 450 and an invoker 470.

The controller 430 may convert a request received from the API gateway 110 to a message form that is executable, and enqueue the message to the message queue 450.

According to an embodiment of the disclosure, the controller 430 may ultimately determine the priorities of requests based on at least one of the grades of priorities designated at the API gateway 110 and/or information on the topology structure among functions (function topology information). Function topology information may be generated at a function topology management module 421. The function topology management module 421 will be described in more detail later with reference to FIG. 6.

Also, the controller 430 may enqueue messages to a plurality of message queues 450 having different priorities from one another according to the determined priorities. For example, as illustrated in FIG. 4, the message queues 450 may include message queues having high priorities and message queues having low priorities, and the controller 430 may enqueue messages having high priorities to message queues having high priorities, and enqueue messages having low priorities to message queues having low priorities, respectively. That is, as described above, the system 100 may operate a plurality of message queues, and process requests while allocating a priority for each message queue.

An invoker 470 may dequeue messages from the message queues 450, and execute functions corresponding to the dequeued messages. The controller 430 may receive a list of invokers that are currently available, and determine a subject to be executed. According to an embodiment of the disclosure, the invoker 470 may execute a code corresponding to a function on a container. The result of executing a function may be transmitted to the client 200.

Figure 5:
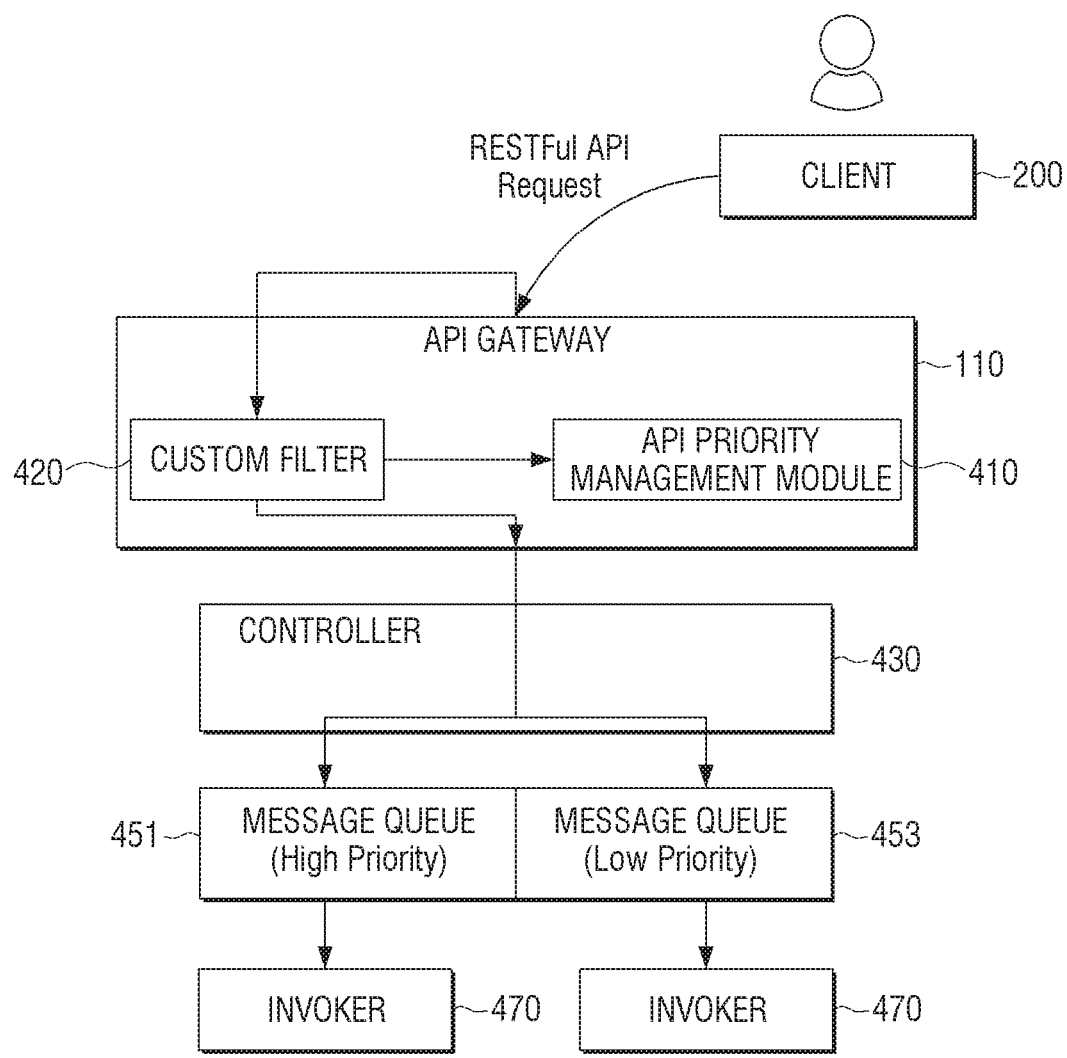
FIG. 5 is a diagram for illustrating the operation of an application programming interface (API) gateway according to an embodiment of the disclosure.

FIG. 5 is a diagram for illustrating the operation of the API gateway 110 according to an embodiment of the disclosure.

Referring to FIG. 5, the API gateway 110 may include an API priority management module 410 and a custom filter 420.

When a request to execute a function, for example, a RESTful API request is received from the client 200, the custom filter 420 may inquire to the API priority management module 410 regarding an SLA for a function corresponding to the request, and input information on the SLA to the HTTP header field. Then, based on the input information on the SLA, the API priority management module 410 may determine grades of priorities for complying to the SLA.

The controller 430 may convert a request received from the API gateway 110 into a message format. A message has a data structure wherein a resource that is needed for executing the message, etc. have been defined. The controller 430 may determine priorities of requests by reflecting the grades of priorities that were determined at the API priority management module 410. When priorities are determined, the controller 430 may enqueue messages to message queues, such that messages having higher priorities can be executed earlier. According to an embodiment of the disclosure, there may be a plurality of message queues, and for example, there may be a message queue 451 having a high priority and a message queue 453 having a low priority. The controller 430 may enqueue a message having a high priority to the message queue 451 having a high priority.

The invoker 470 may dequeue messages starting from a message queue having a high priority, and execute the messages. According to an embodiment of the disclosure, the invoker 470 may vary dequeue weights according to the priorities of message queues. Accordingly, the order of processing functions may be determined in a direction of complying with the SLA as much as possible.

Then, the invoker 470 may execute a code of a function corresponding to a message by performing operations such as allocating a different virtual machine and installing a different operating system (OS) according to the message specification, and installing a library.

Figure 7:
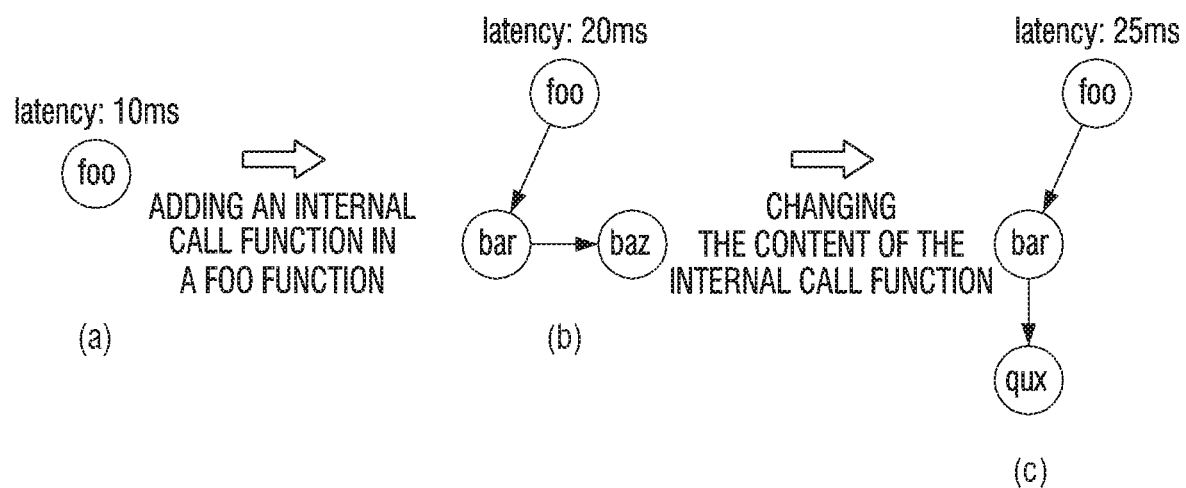
FIG. 7 is a diagram for illustrating function versioning according to an embodiment of the disclosure.

FIG. 7 is a diagram for illustrating the operation of the controller 430 according to an embodiment of the disclosure.

A function topology management module 431 may generate function topology information. The function topology information may indicate the relation of connection between functions. For example, if a first function executes a second function, and the second function executes a third function, information on the consecutive execution of functions may be included in the function topology information. Further, the function topology information may also include information on execution time of each function. Accordingly, in case a specific function is executed, the execution time of other functions to be consecutively executed can also be predicted.

In case a user (a developer) registers a new function, the function is registered through the controller 430. Thus, the function topology management module 431 may add a new node (a new function) to the function topology information.

Also, the function topology management module 431 may accumulate data of the function topology information while monitoring which function has been added, and which function called which function.

Such function topology information may have a big size of data due to the number of functions and complexity in connection. Accordingly, a technology for big data may be used. For example, a technology for processing dispersion of big data through database sharding, MapReduce®, Spark® and the like may be used.

Meanwhile, in serverless computing, a content and a required specification of a function may be dynamically changed. Accordingly, in case a function is changed during a process, a change also occurs in the latency between the time when a request to execute the function is made and the time when a response is made. The function topology management module 431 may continuously record such a change, and may also perform versioning according to the change of the function. This will be described in more detail below with reference to states (a), (b), and (c) of FIG. 7.

Referring to case (a) of FIG. 7, there was a function named "foo" at the start, and the latency of the function was 10 ms. The function topology management module 431 may record the version at the time as a 0.1 version. Afterwards, referring to case (b) of FIG. 7, in case a correction occurs in the foo function, and a bar function is added as an internal call function, the latency may be increased to 20 ms. The function topology management module 431 may record the version at the time as a 0.2 version. Then, referring to case (c) of FIG. 7, the content of the bar which is an internal call function may be changed, and the connecting function of the bar may also be changed from baz to quz, and the latency may be increased to 25 ms. The function topology management module 431 may record the version at the time as a 0.3 version.

In case a function is changed such that it cannot comply with the SLA, the controller 430 may call a function in a previous version. For example, in the embodiment illustrated in FIG. 7, if the allowed latency defined by the SLA cannot help being exceeded with a 0.3 version, a version in a 0.2 version may be called. That is, the SLA can be fulfilled by versioning as described above.

Change of function topology information according to addition of a function and version update may be dynamically reflected during a runtime.

In case a first function calls another second function on the inside, a request for the call may be transmitted to the controller 430, and the controller 430 may predict which function the second function may call based on function topology information, and may also predict the time that will be spent for the execution to be completed. Further, the controller 430 may calculate the remaining time based on the predicted time and SLA information, and determine the priorities of functions based on the remaining time.

Figure 6:
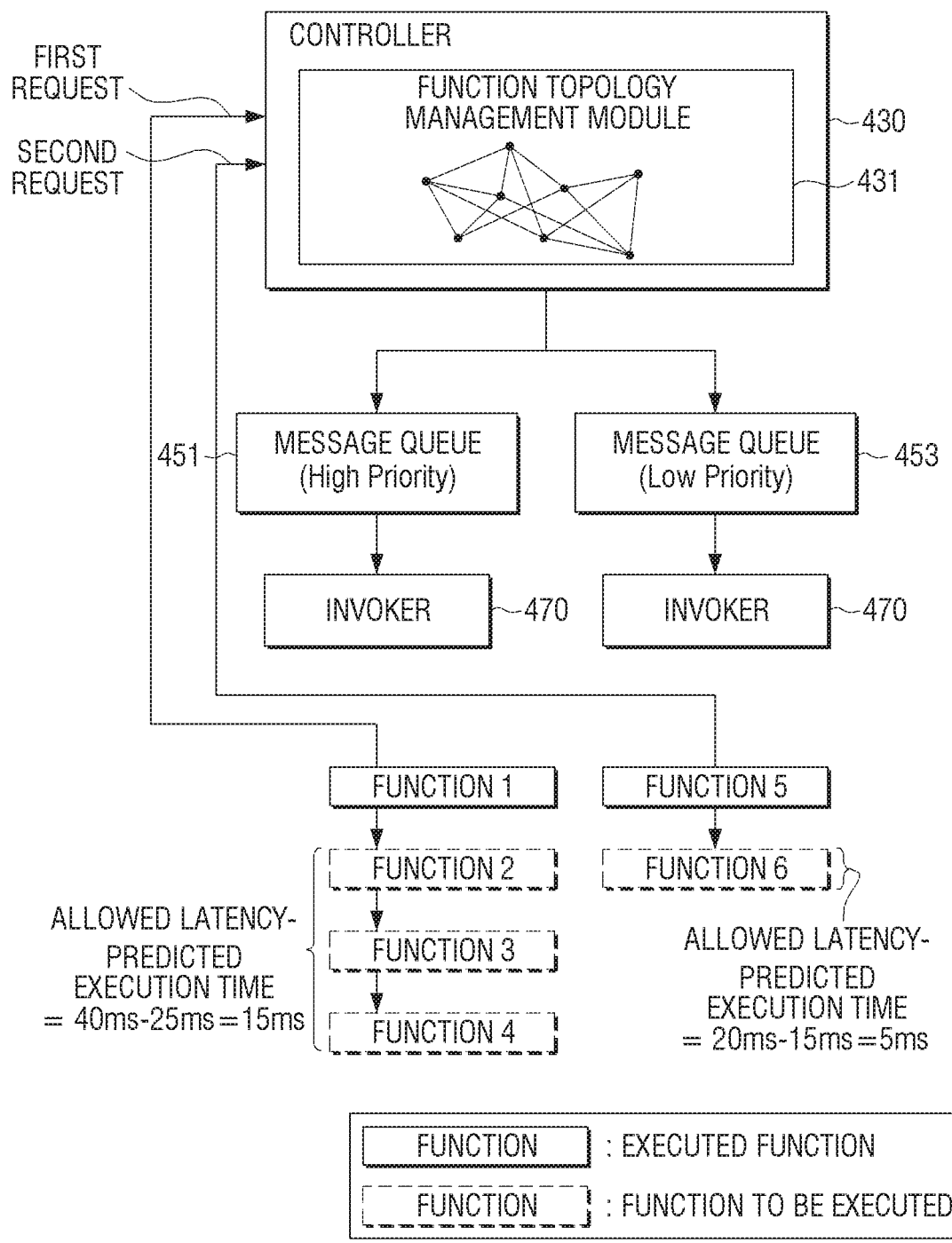
FIG. 6 is a diagram for illustrating the operation of a computing device according to an embodiment of the disclosure.

FIG. 6 is a diagram for illustrating the operation of a computing device according to an embodiment of the disclosure.

For example, referring to FIG. 6, when a request of function 1 to internally call function 2 (a first request) is received, and a request of function 5 to internally call function 6 (a second request) is received, the controller 430 may determine the priorities of the first request and the second request based on the remaining execution time within a range that the SLA can be fulfilled.

Referring to FIG. 6, in case function 2 is executed, the controller 430 may calculate that the predicted execution time is 25 ms including the execution time for functions 3 and 4 that will be consecutively executed after function 2, based on function topology information. Also, the controller 430 may check that the allowed latency is 40 ms from the SLA information included in the request to execute function 1 received from the API gateway 110, and based on this, may check that there is still remaining time of 15 ms left for the first request. In the same manner, in case function 6 is executed, the controller 430 may calculate that the predicted execution time is 25 ms based on function topology information, and check that the allowed latency is 20 ms from the SLA information included in the request to execute function 5 received from the API gateway 110, and based on this, may check that there is still remaining time left for the second request. To sum up, as there is remaining time of 15 ms left for the first request, and remaining time of 5 ms left for the second request, the controller 430 gets to process the second request first, of which remaining time left is shorter. That is, the controller 430 may determine the priority of the next function to be inverse proportional to the remaining time.

According to an embodiment of the disclosure, the function topology management module 431 may calculate the remaining time for a specific function, and provide an API determining the priority. Then, the controller 430 may call the API and calculate the remaining time, and determine the priority. Meanwhile, if the response time of the API is not real time due to the number and complexity of functions, for example, if the time exceeds 10 ms, the controller 430 may determine the priority in consideration of only the SLA, without applying function topology information. Also, in order to minimize the response time of the API, promotion of efficiency of the data size, and structuring of the data size may be performed, by using a knowledge representation method based on graphs, a knowledge representation method based on ontology and the like.

As described above, priorities of requests may be determined based on SLA information and predicted execution time of functions. That is, the order of calling functions may be determined in service units.

At least one of the API gateway 110, computing device 120, API priority management module 410, custom filter 420, controller 430, function topology management module 431, message queue 450 or invoker 470 in FIGS. 3 to 6 may be manufactured in the form of hardware and mounted on one apparatus, or the components may be respectively mounted on separate apparatuses. In addition, at least one of the gateway 110, computing device 120, API priority management module 410, custom filter 420, controller 430, function topology management module 431, message queue 450 or invoker 470 may be implemented as a software module. Meanwhile, in case at least one of the gateway 110, computing device 120, API priority management module 410, custom filter 420, controller 430, function topology management module 431, message queue 450 or invoker 470 is implemented as a software module (or, a program module including instructions), the software module may be stored in a non-transitory computer readable medium. Also, in such a case, the at least one software module may be provided by an OS, or provided by a predetermined application. Or, a portion of the at least one software module may be provided by an OS, and the other portions may be provided by a predetermined application.

Figure 8:
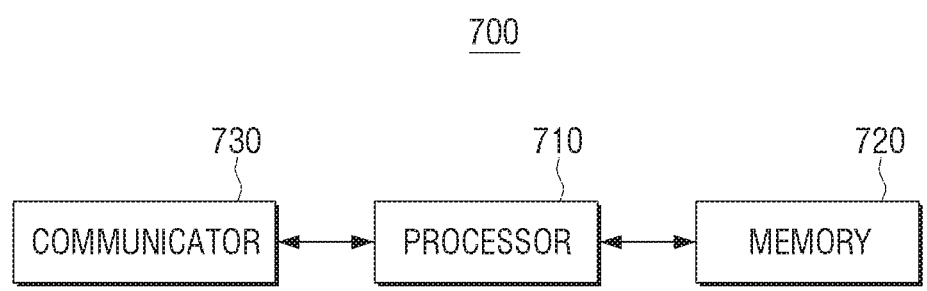
FIG. 8 is a block diagram for illustrating the constitution of an electronic apparatus according to an embodiment of the disclosure.

FIG. 8 is a block diagram for illustrating the constitution of an electronic apparatus according to an embodiment of the disclosure.

An electronic apparatus 700 may be implemented as a server, for example, a cloud server or an artificial intelligence server. The electronic apparatus 700 may consist of one or more servers. However, the disclosure is not limited thereto, and the electronic apparatus 700 may be implemented as any electronic apparatus.

Referring to FIG. 8, the electronic apparatus 700 according to an embodiment of the disclosure may include a processor 710, a memory 720 and a communicator 730.

The processor 710 is a component for controlling the overall operation of the electronic apparatus 700. For example, the processor 710 may control a plurality of hardware or software components connected to the processor 710 by driving the management system and applications, and perform various kinds of data processing and operation. The processor 710 may be referred to as a controller. The processor 710 may include more than one processor or a single processor. The processor 710 may be a CPU or a graphics-processing unit (GPU), or both. Further, the processor 710 may be implemented as at least one general processor, digital signal processor, application specific integrated circuit (ASIC), system on chip (SoC), microcomputer (MICOM) and the like.

Also, the processor 710 may execute at least one instruction that is stored in a memory 720.

The memory 720 may store various kinds of data, programs or applications for driving and controlling the electronic apparatus 700. Programs stored in the memory 720 may include one or more instructions. Programs (one or more instructions) or applications stored in the memory 720 may be executed by the processor 710.

The communicator 730 may transmit and receive data or signals with external apparatuses by control of the processor 710. For example, the communicator 730 may include one or more components that enable communication through a local area network (LAN), a wide area network (WAN), a value added network (VAN), a mobile radio communication network, a satellite communication network and a combination thereof. In addition, the communicator 730 may transmit and receive data or signals directly with external apparatuses or external servers by using a wireless LAN (e.g., Wi-Fi) and the like.

Meanwhile, the electronic apparatus 700 may perform the operation of at least one of the API gateway 110 and the computing device 120 as described in FIGS. 3 to 6. For example, the electronic apparatus 700 may perform the operations of the API gateway 110 and the computing device 120. As another example, the electronic apparatus 700 may be implemented in such a way that it performs the operation of the computing device 120, and communicates with an external apparatus performing the operation of the API gateway 110.

According to an embodiment of the disclosure, the electronic apparatus 700 may perform the operation of at least one of the API priority management module 410, custom filter 420, controller 430, function topology management module 431, message queue 450 and invoker 470 as described in FIGS. 3 to 6.

For example, the processor 710 may receive a request to execute a function through the communicator 730. In case the electronic apparatus 700 is implemented as an apparatus performing the operation of the API gateway 110, the processor 710 may receive a request to execute a function from the client 200 through the communicator 730. As another example, in case the electronic apparatus 700 is implemented in such a way that it performs the operation of the computing device 120, and communicates with an external apparatus performing the operation of the API gateway 110, the processor 710 may receive a request to execute a function from the external apparatus performing the operation of the API gateway 110 through the communicator 730.

Also, the processor 710 may identify an SLA for a function corresponding to the received request to execute a function.

According to an embodiment of the disclosure, in case the electronic apparatus 700 is implemented as an apparatus performing the operation of the API gateway 110, the memory 720 may store SLA information for functions. The processor 710 may search SLA information for a function corresponding to the request received from a client in the memory 720, and thereby identify an SLA for the function. Then, the processor 710 may include the identified SLA information in the request. For example, the processor 710 may input the SLA information in the HTTP header field of the request. According to an embodiment of the disclosure, the processor 710 may determine the grade of an SLA for a request based on the SLA information. There may be a plurality of grades of an SLA, and for instance, the plurality of grades may include premium, high, default and economy grades. The grades of an SLA may be selected by a user (a developer). Selection of grades of an SLA will be described in more detail later, with reference to FIGS. 9 and 10.

According to another embodiment of the disclosure, in case the electronic apparatus 700 is implemented such that it performs the operation of the computing device 120, and communicates with an external apparatus performing the operation of the API gateway 110, the processor 710 may identify an SLA for a function corresponding to the request from the SLA information included in the received request. For example, the processor 710 may identify an SLA for a function by checking information on the SLA included in the HTTP header of the request. The meaning of identifying an SLA may include identifying grades of an SLA.

Further, in case there are a plurality of requests, the processor 710 may determine priorities of a plurality of functions based on the SLA identified for the plurality of functions corresponding to the plurality of requests.

For example, the processor 710 may determine priorities of a plurality of functions based on the SLA and function topology information for each of the plurality of functions.

Meanwhile, function topology information may be provided from an external apparatus, or generated by the electronic apparatus 700 itself. In the case of the latter, the processor 710 may obtain information on consecutive execution of functions based on a specific function internally calling another function, and generate function topology information based on the obtained information on consecutive execution of functions.

The processor 710 may change the function topology information according to registration of a new function and correction of a pre-registered function.

In addition, the processor 710 may store a plurality of versions for the pre-registered function according to correction of the pre-registered function, and if correction that cannot comply with the SLA occurs with respect to the pre-registered function and a request to execute the pre-registered function is received, the processor 710 may execute the pre-registered function in a version of the time before the correction that cannot comply with the SLA occurred. That is, the processor 710 may perform versioning according to change of a function, as described above.

Further, the processor 710 may calculate, with respect to each of the plurality of functions which were requested to be executed, a remaining time which is a result of subtracting from an allowed latency defined by the SLA a predicted execution time calculated based on the function topology information, and determine priorities of the plurality of functions in the order of having a less remaining time calculated with respect to each of the plurality of functions. That is, the processor 710 may determine priorities to be inverse proportional to the remaining time, as described with reference to FIG. 6 earlier.

Also, the processor 710 may execute a plurality of functions according to the determined priorities. In the memory 720, codes corresponding to the registered functions, and data, files, a library and the like that are necessary for executing functions may be stored, and the processor 710 may execute functions based on them.

According to an embodiment of the disclosure, the processor 710 may convert the plurality of requests into message formats, and insert each of the plurality of messages generated by the conversion into a first message queue or a second message queue according to the priorities determined for each of the plurality of functions, dequeue the message inserted into the first message queue prior to the message inserted into the second message queue, and execute a function corresponding to the dequeued message. Here, the first message queue may correspond to, for example, a message queue 451 having a high priority, and the second message queue may correspond to a message queue 453 having a low priority as described in FIG. 6.

Also, the processor 710 may control the communicator 730 to transmit the result of execution of a function, i.e., a response, to the client.

Meanwhile, before actually executing a function, it cannot be figured out how much time it will take to execute the function. Accordingly, the allowed latency of an SLA cannot be set. Thus, when a function is registered for the first time, an SLA may not be set, but instead, a trial period may be given to a user (a developer). During a trial period, the electronic apparatus 700 may learn about all the grades of the SLA (e.g., premium, high, default and economy grades). When learning is completed, the electronic apparatus 700 may make the user select a grade. Also, the electronic apparatus 700 may provide a UI that enables the user to select a grade of the SLA.

Examples of an UI provided by electronic apparatus 700 will be described below with reference to FIGS. 9 and 10.

FIG. 9 is a diagram for illustrating a UI that may be provided during a trial period according to an embodiment of the disclosure.

Referring to FIG. 9, a user may select an SLA when a function is generated, for example, an SLA corresponding to a premium, a high, a default or an economy grade. However, as a grade cannot be specified at first, a UI may be provided which enables the user to experience a trial period, as described in FIG. 9.

During the trial period, the processor 710 may execute functions for all the grades of the SLA, and register information for each grade in the memory 720. According to an embodiment of the disclosure, information for each grade may be registered in the database of the API priority management module 410. That is, for each grade, a standard for how much latency will be ensured between the time when a request to execute a function is made and the time when a response is made may be generated. When registration of information for each grade is completed, setting of grades may be activated.

Meanwhile, during the trial period, the user may be charged with a charge late which corresponds to the lowest grade.

FIG. 10 is a diagram for illustrating an embodiment of a UI that may be provided to a user when setting of grades is activated.

Referring to FIG. 10, a user may select a grade of the SLA for a function through a UI. For example, referring to FIG. 10, in a premium grade, the allowed latency is 3 seconds, and in a high grade, the allowed latency is 6 seconds. Meanwhile, in a default grade, the allowed latency is 5 seconds, and in an economy grade, the allowed latency is 20 seconds. The user may select one of the grades.

As in the above embodiment described with reference to FIGS. 9 and 10, when a new function is registered, the processor 710 may obtain information on the execution time of the new function for a preset time (e.g., a trial period), determine a plurality of SLAs in different grades for the new function based on the obtained information on the execution time, and provide a UI for selection of any one of the plurality of determined SLAs.

Meanwhile, the processor 710 may provide a UI at an external apparatus by transmitting information on the UI to the external apparatus through the communicator 730.

Further, when an SLA for a new function is set through a UI, the processor 710 may receive information on the SLA through the communicator 730, and may associate the information on the set SLA with the new function and store the information in the memory 720. When a request to execute a function is received based on the information stored in the memory 720 as described above, the SLA for the function may be identified.

Figure 11:
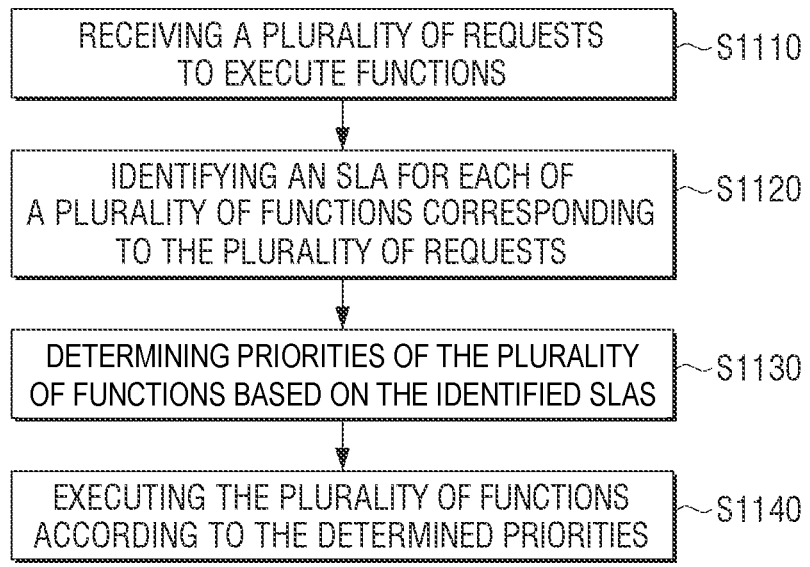
FIG. 11 is a flow chart for illustrating a method of controlling an electronic apparatus according to an embodiment of the disclosure.

FIG. 11 is a flow chart for illustrating a method of controlling an electronic apparatus according to an embodiment of the disclosure. The flow chart illustrated in FIG. 11 may consist of operations processed at the electronic apparatus 700 described in the disclosure. Accordingly, the contents described with respect to the electronic apparatus 700 may also be applied to the flow chart illustrated in FIG. 11, even if the contents are omitted below.

Referring to FIG. 11, an electronic apparatus may receive a plurality of requests to execute functions at operation S1110.

Also, at the electronic apparatus, an SLA for each of a plurality of functions corresponding to a plurality of requests may be identified at operation S1120.

In this case, information on the SLAs included in the HTTP headers of the plurality of requests may be checked at the electronic apparatus, and the SLA for each of the plurality of functions may thereby be identified.

Then, at the electronic apparatus, priorities of the plurality of functions may be determined based on the identified SLAs at operation S1130.

In this case, at the electronic apparatus, priorities of the plurality of functions may be determined based on the SLA for each of the plurality of functions and function topology information.

To generate topology information, the electronic apparatus may obtain information on consecutive execution of functions based on a specific function internally calling another function. Also, the electronic apparatus may change the function topology information according to registration of a new function and correction of a pre-registered function.

Meanwhile, for the SLAs, allowed latency may have been set. Also, the SLAs may specify a promise that execution of functions within an allowed latency is ensured, and if the promise is not kept, a refund will be given.

Further, the electronic device may calculate, with respect to each of the plurality of functions which were requested to be executed, a remaining time which is a result of subtracting from an allowed latency defined by the SLA a predicted execution time calculated based on the function topology information, and determine priorities of the plurality of functions in the order of having a less remaining time calculated with respect to each of the plurality of functions.

Also, at the electronic apparatus, the plurality of functions may be executed according to the determined priorities at operation S1140.

According to an embodiment of the disclosure, at the electronic apparatus, a plurality of requests may be converted into message formats, and each of the plurality of messages generated by the conversion may be inserted into a first message queue or a second message queue according to the priorities determined for each of the plurality of functions, the message inserted into the first message queue may be dequeued prior to the message inserted into the second message queue, and a function corresponding to the dequeued message may be executed. By this process, the plurality of functions may be executed according to the determined priorities.

Meanwhile, at the electronic apparatus, a plurality of versions for the pre-registered function may be stored according to correction of the pre-registered function, and if correction that cannot comply with the SLA occurs with respect to the pre-registered function and a request to execute the pre-registered function is received, the pre-registered function may be executed in a version of the time before the correction that cannot comply with the SLA occurred.

Further, at the electronic apparatus, when a new function is registered, information on the execution time of the new function for a preset time may be obtained. The preset time corresponds to a trial period. Also, at the electronic apparatus, a plurality of SLAs in different grades for the new function may be determined based on the obtained information on the execution time. In addition, at the electronic apparatus, a UI for selection of any one of the plurality of determined SLAs may be provided. According to an embodiment of the disclosure, the electronic apparatus may transmit information on the UI to an external apparatus, and as a result, the UI may be displayed on a display of the external apparatus.

Here, when an SLA for the new function is set through the provided UI, information on the set SLA may be associated with the new function, and the information may be stored in the electronic apparatus.

According to the various embodiments of the disclosure described above, the order of executing requests for functions may be determined based on function topology. Accordingly, an SLA can be guaranteed as much as possible in a serverless computing system.

The various embodiments of the disclosure described above may be implemented as software, hardware or a combination thereof. According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions. In particular, the various embodiments described above may be implemented by the processor 710 of the electronic apparatus 700. Meanwhile, according to implementation by software, the embodiments such as procedures and functions described in the disclosure may be implemented as separate software modules. Each of the software modules may perform one or more functions and operations described in the disclosure.

Also, the various embodiments described in the disclosure may be implemented as software including instructions that can be stored in machine-readable storage media, which can be read by machines (e.g., computers). The machines refer to apparatuses that call instructions stored in a storage medium, and can operate according to the called instructions, and the apparatuses may include the electronic apparatus 700 according to the embodiments described in the disclosure.

In case an instruction as described above is executed by a processor, the processor may perform a function corresponding to the instruction by itself, or by using other components under its control. An instruction may include a code that is generated or executed by a compiler or an interpreter. For example, as an instruction stored in a storage medium is executed by a processor, the method of controlling an electronic apparatus as described above may be executed. For instance, as an instruction stored in a storage medium is executed by the processor of a machine (or an electronic apparatus), a method of controlling an electronic apparatus may be performed, which includes receiving a plurality of requests to execute functions, identifying an SLA for each of a plurality of functions corresponding to the plurality of requests, determining priorities of the plurality of functions based on the identified SLAs, and executing the plurality of functions according to the determined priorities.

A storage medium that is readable by machines may be provided in the form of a non-transitory storage medium. Here, the term 'non-transitory' only means that a storage medium does not include signals, and is tangible, but does not indicate that data is stored in the storage medium semi-permanently or temporarily.

Also, according to an embodiment of the disclosure, the method according to the various embodiments described in the disclosure may be provided while being included in a computer program product. A computer program product refers to a product, and it can be traded between a seller and a buyer. A computer program product can be distributed on-line in the form of a storage medium that is readable by machines (e.g. compact disc read only memory (CD-ROM)), or through an application store (e.g. play store™, app store™). In the case of on-line distribution, at least a portion of a computer program product may be stored in a storage medium such as the server of the manufacturer, the server of the application store and the memory of the relay server at least temporarily, or may be generated temporarily.

Further, each of the components (e.g., a module or a program) according to the various embodiments of the disclosure may consists of a singular object or a plurality of objects. Also, among the aforementioned corresponding sub components, some sub components may be omitted, or other sub components may be further included in the various embodiments. Generally or additionally, some components (e.g. a module or a program) may be integrated as an object, and perform the functions that were performed by each of the components before integration identically or in a similar manner. Operations performed by a module, a program or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a communicator;
a memory configured to store at least one instruction; and
at least one processor configured to execute the at least one instruction,
wherein the at least one processor is configured to:
receive a plurality of requests through the communicator, each of the plurality of requests comprising a request to execute a function of a plurality of functions,
identify a service-level agreement (SLA) for each of the plurality of functions corresponding to the plurality of requests,
obtain function topology information based on information on consecutive execution of functions of the plurality of functions,
determine priorities of the plurality of functions based on the identified SLAs and the function topology information, and execute the plurality of functions based on the determined priorities.

2. The electronic apparatus of claim 1, wherein the at least one processor is further configured to:
change the function topology information based on registration of a new function and correction of a pre-registered function.

3. The electronic apparatus of claim 2, wherein the at least one processor is further configured to:
store a plurality of versions for the pre-registered function based on correction of the pre-registered function, and
when correction that cannot comply with the SLA occurs with respect to the pre-registered function and a request to execute the pre-registered function is received, execute the pre-registered function in a version of time before the correction that cannot comply with the SLA occurred.

4. The electronic apparatus of claim 1, wherein the at least one processor is further configured to:
calculate a remaining time with respect to each of the plurality of functions, which is a result of subtracting from allowed latency defined by the SLA a predicted execution time calculated based on the function topology information, and determine the priorities of the plurality of functions in an order of having a less remaining time calculated with respect to each of the plurality of functions.

5. The electronic apparatus of claim 1, wherein the at least one processor is further configured to:
check information on the SLAs included in hypertext transfer protocol (HTTP) headers of the plurality of requests, and
identify the SLA for each of the plurality of functions.

6. The electronic apparatus of claim 1, wherein the at least one processor is further configured to:
convert the plurality of requests into message formats,
insert each of a plurality of messages generated by the conversion into a first message queue or a second message queue based on the priorities determined for each of the plurality of functions,
dequeue a message of the plurality of messages inserted into the first message queue prior to a message of the plurality of messages inserted into the second message queue, and execute a function corresponding to the dequeued message.

7. The electronic apparatus of claim 1, wherein the at least one processor is further configured to:
when a new function is registered, obtain information on an execution time of the new function for a preset time,
determine a plurality of SLAs in different grades for the new function based on the obtained information on the execution time, and
provide a user interface (UI) for selection of any one of the plurality of determined SLAs.

8. The electronic apparatus of claim 7, wherein the at least one processor is further configured to:
when an SLA for the new function is set through the provided UI, associate information on the set SLA with the new function, and
store the information in the memory.

9. A method for controlling an electronic apparatus, the method comprising:
receiving a plurality of requests, each of the plurality of requests comprising a request to execute a function of a plurality of functions, the functions performed on elements that contain a hardware processor and non-transitory memory;
identifying a service-level agreement (SLA) for each of a-the plurality of functions corresponding to the plurality of requests;
obtaining function topology information based on information on consecutive execution of functions of the plurality of functions;
determining priorities of the plurality of functions based on the identified SLAs and the function topology information; and
executing the plurality of functions based on the determined priorities.

10. The method of claim 9, further comprising:
changing the function topology information based on registration of a new function and correction of a pre-registered function.

11. The method of claim 10, further comprising:
storing a plurality of versions for the pre-registered function based on correction of the pre-registered function; and
when correction that cannot comply with the SLA occurs with respect to the pre-registered function and a request to execute the pre-registered function is received, executing the pre-registered function in a version of time before the correction that cannot comply with the SLA occurred.

12. The method of claim 9, wherein the determining of the priorities comprises:
calculating a remaining time with respect to each of the plurality of functions, which is a result of subtracting from an allowed latency defined by the SLA a predicted execution time calculated based on the function topology information; and
determining the priorities of the plurality of functions in an order of having a less remaining time calculated with respect to each of the plurality of functions.

13. The method of claim 9, wherein the identifying comprises:
checking information on the SLAs included in hypertext transfer protocol (HTTP) headers of the plurality of requests and identifying the SLA for each of the plurality of functions.

14. The method of claim 9, further comprising:
converting the plurality of requests into message formats,
wherein executing the plurality of functions comprises:
inserting each of a plurality of messages generated by the conversion into a first message queue or a second message queue based on the priorities determined for each of the plurality of functions;
dequeuing a message of the plurality of messages inserted into the first message queue prior to a message of the plurality of messages inserted into the second message queue; and
executing a function corresponding to the dequeued message.

15. The method of claim 9, further comprising:
when a new function is registered, obtaining information on an execution time of the new function for a preset time;
determining a plurality of SLAs in different grades for the new function based on the obtained information on the execution time; and
providing a user interface (UI) for selection of any one of the plurality of determined SLAs.

16. The method of claim 15, further comprising:
when an SLA for the new function is set through the provided UI, associating information on the set SLA with the new function; and
storing the information in a memory.

* * * * *